United States Patent Office 2,909,565
Patented Oct. 20, 1959

2,909,565

PRODUCTION OF ORGANOMETALLIC COMPOUNDS

David O. De Pree, Baton Rouge, La., assignor to Ethyl Corporation, New York, N. Y., a corporation of Delaware No Drawing. Application February 6, 1958
Serial No. 713,569

5 Claims. (Cl. 260—541)

This invention relates to a process for the preparation of organometallic compounds and in particular is concerned with the preparation of organometallic compounds in which the α-carbon atom of a metal salt of an organic acid is substituted with a metal.

The prior art discloses processes for the preparation of α-metallic substituted organic salts such as α-sodio-sodium ethyl acetate. In general, these processes involve the consumption of two equivalents of metal for each equivalent of the α-metallo-metallic salt of an organic acid produced. For example, α-sodio-sodium caproate is described as being formed when reacting sodium caproate concurrently with sodium and benzene and passing amyl chloride through the reaction mixture. Thus, the sodium reacts with the amyl chloride in situ to produce amyl sodium and sodium chloride, thus consuming two equivalents of the metal. The amyl sodium then reacts with the sodium caproate to produce α-sodio-sodium caproate. In addition, the processes taught in the art result in the formation of other organometallic compounds which hinder the separation of the α-metallo-metallic compounds and because of these impurities limits their usage since these foreign compounds undergo competing reactions. Further, the process encompasses a complexity of undesirable side reactions difficult to control. An improvement to the processes described above is the reaction between metallic amides and metal salts of organic acids whereby utilization of equal equivalents of the reactants is achieved. This process results in high yields and purity of the desired product. However, the art is particularly devoid of a process for the preparation of α-metallo-metallic salts of organic acids wherein a metal salt of an organic acid and a metal are reacted.

It is an object of this invention to provide a new process. A particular object is to provide a process for the preparation of α-metallic substituted metal salts of organic acids in high yield and purity.

The above and other objects of this invention are accomplished by reacting an alkali or alkaline earth metal salt of an organic acid containing at least one α-hydrogen atom with a metal in the presence of a catalyst selected from the group consisting of metal amides and metal hydrides. Each of the aforesaid metals is selected from the group consisting of alkali and alkaline earth metals. In general, it is preferred to employ alkali metals and the salt of a carboxylic acid having at least one α-hydrogen atom.

In an especially preferred embodiment the metal salts of carboxylic acids having at least one α-hydrogen atom are reacted with an alkali metal in the presence of catalytic amounts of alkali metal amides or hydrides. By catalytic amounts in this preferred embodiment is meant up to 5 percent of the weight of the acid salt employed in the reaction system. Furthermore, the temperature employed preferably ranges from the decomposition temperature of the product produced in the reaction to 20 degrees less than the decomposition temperature. It is also preferred to employ substantially equimolar quantities of the alkali metal and the alkali metal salt of the aforesaid carboxylic acid. The reactants should also be preponderantly anhydrous and preferably of a small particle size. Additionally the starting materials should be essentially free of organometallic compounds or compounds that would form organometallic compounds other than the products desired. In one embodiment the catalyst and reactants are prepared in the reaction vessel and heated in an inert atmosphere to initiate the reaction. The pressures employed are essentially atmospheric and volatile by-products are continuously removed. A preferred example of the aforementioned especially preferred embodiment comprises reacting sodium acetate with sodium in the presence of catalytic amounts of sodamide employing atmospheric pressure and temperatures below 280° C.

A particular advantage of the process of this invention is that the products obtained are substantially in their pure form in high yield. The purity of the product obtained is important since its separation from other compounds is quite difficult. If other organometallic compounds were present, as for example, amyl sodium, these materials would react competitively with the metallo-metallic organic acid salt in any of its applications. Another particular advantage of this process is that the α-metallo-metallic organic acid salts are prepared in an extremely economical manner. For example, the sodium atom is substituted at the α-position by the employment of one mole of sodium per mole of product. As has been pointed out above, the prior art processes require two moles of sodium per mole of product or the employment of a sodamide rather than the economical sodium metal.

To more fully demonstrate the process of this invention, the following working examples in which all parts and percentages are by weight are presented.

Example I

Into a reaction vessel provided with means for charging, heating, stirring, and additionally provided with fittings for inlet and outlet of nitrogen was added 113 parts of anhydrous sodium acetate. A nitrogen flush was started and the system was heated at 261° to 274° C. for one hour. Thereafter 30 parts of sodium was added in small pieces followed by the addition of a catalytic amount of sodium amide (1.4 parts). The nitrogen was discontinued and the reaction conditions maintained for 3¾ hours. The system was then shut down. A nitrogen flush was started. Stirring was stopped at 70° C. When the reactor cooled to room temperature the product was withdrawn. To a sample of the reaction product weighing approximately 1 gram was added under nitrogen atmosphere 3 milliliters of deuterium oxide in a slow manner. Excess deuterium oxide was removed into vacuo in a drying pistol. When all the liquids had been removed, the pistol was heated under vacuum at 140° for 16 hours to decompose any residual hydrate. The anhydrous product was heated at 100° C. with an excess of dimethyl sulfate and the methyl acetates formed were condensed and examined with a mass spectrometer. From the ratio of the peaks the mole ratio of α-sodio-sodium acetate to sodium acetate in the sample was determined to be 8.55:1 corresponding to approximately 91 percent yield of α-sodio-sodium acetate based on total conversion of sodium acetate.

No reaction was initiated when the above reaction was repeated utilizing essentially the same reaction conditions with the exception that no sodamide catalyst was employed.

The following working examples illustrate the undesirability of utilizing low temperatures in the process of this invention—that is, temperatures markedly below the range extending from the decomposition temperature of the product formed to 20 degrees less than said decomposition temperature.

Example II

Three parts of sodium chloride were placed in a reaction vessel provided with means for heating, stirring, and gas inlets and outlets. Ten parts of sodium were added to the vessel. The vessel was heated to 200° C. whereupon 35.28 parts of sodium acetate were added to the reaction. Nitrogen flushing was initiated and temperature in the system dropped to 175° C. whereupon 0.64 part sodamide was added. The temperature was then raised to 228° C. and reaction conditions maintained for 4 hours. The system was cooled and mass spectrometer analysis indicated a low yield of the desired product α-sodio-sodium acetate.

The following examples illustrate that salts of organic acids other than sodium acetate can be utilized.

Example III

α-Sodio-sodium phenyl acetate is prepared by the reaction of sodium phenyl acetate with sodium in the presence of catalytic amounts of sodamide utilizing procedures essentially the same as described in Example I.

Example IV

α-Sodio-sodium vinyl acetate is prepared by reacting sodium vinyl acetate with sodium in the presence of catalytic amounts of sodamide essentially as described in Example I.

Example V 180 parts of 2-cyclopentyl sodium acetate and 39.1 parts of potassium are reacted in the presence of 1.91 parts of potassium amide essentially the same as described in Example I. The product α-potassio-2-cyclopentyl sodium acetate is thereby prepared.

Example VI

The procedure of Example I is followed with the exception that 156 parts of 2-benzyl lithium acetate and 14.6 parts of magnesium metal utilizing 2.12 parts of magnesium hydride to produce the product α-magnesium-2-benzyl lithium acetate.

Other starting materials, other than those taught in the above examples, can be employed with equal results. Thus, the organic portion of the metal salt of an organic acid containing at least one α-hydrogen atom denotes a univalent, aliphatic or alicyclic or aromatic radical which can be further substituted. By the term organic portion is meant that part of the acid salt other than the carboxylic functional group,

By the term univalent aliphatic is intended a univalent radical derived from an open chain saturated or unsaturated carbon compound. The term univalent alicyclic radical denotes a univalent radical derived from the corresponding aliphatic compounds by ring formation. Thus, the organic portion of the metal salt of an organic acid containing at least one α-hydrogen atom can be radicals such as the alkyl radicals, methyl, ethyl, isopropyl, n-butyl, isobutyl, tertiary butyl, n-amyl, and various positional isomers such as, for example, 2-methylbutyl, 1,2-dimethylpropyl, and 1-ethylpropyl, and likewise, the corresponding straight or branched chain isomers of hexyl, heptyl, octyl, and the like up to and including about eicosyl. Moreover, such monovalent aliphatic radicals can be alkenyl radicals such as, for example, ethenyl, $\Delta^1$-propenyl, isopropenyl, $\Delta^2$-butenyl, $\Delta^3$-butenyl, and the corresponding branched chain isomers thereof, and other alkenyl radicals such as hexenyl, heptenyl, octenyl, up to and including eicosenyl, and their corresponding branched chain isomers. Further, such monovalent hydrocarbon substituents can be aralkyl radicals such as, for example, benzyl, α-phenylethyl, β-phenylpropyl, γ-phenylpropyl, β-phenylisopropyl, α-phenylbutyl, γ-phenylbutyl, and the like, and α'-naphthylmethyl, α-(α'-naphthyl)-ethyl, α-(β'-naphthyl)-ethyl, and the like, and their corresponding positional isomers. Moreover, the univalent aliphatic radical or radicals can be aralkenyl radicals such as, for example, α-phenyl ethenyl, α-phenyl-$\Delta^1$-propenyl, β-phenyl-$\Delta^1$-propenyl, α-phenyl-$\Delta^2$-propenyl, α-phenylisopropenyl, β-phenylisopropenyl, and similarly, the phenyl derivatives of the isomers of butenyl, pentenyl, and the like. Other such aryl alkenyls include α-(α'-naphthyl)-ethenyl, β-(α'-naphthyl)-ethenyl, α-(β'-naphthyl)-$\Delta^1$-propenyl, β-(β'-naphthyl)-$\Delta^1$-propenyl, α-(β' - naphthyl) - $\Delta^2$ - propenyl, α - (α' - naphthyl) - isopropenyl, and the like.

When the monovalent hydrocarbon radical is a univalent alicyclic radical or radicals, these can be selected from the group consisting of cycloalkyl and cycloalkenyl radicals. Thus, for example, they can be the cycloalkyl radicals, cyclopropyl, cyclobutyl, cycloamyl, cyclohexyl, and the like, and such cycloaliphatic radicals as α-cyclopropylethyl, β-cyclobutylpropyl, and the like. Similarly, the alicyclic radicals can be cycloalkenyl radicals such as, for example, α-cyclohexyl ethenyl, α-cycloheptyl-$\Delta^1$-propenyl, β-cyclooctyl-$\Delta^2$-propenyl, β-cyclononyl isopropenyl, and the like. When the monovalent hydrocarbon radical is a univalent aromatic radical or radicals, these can be selected from the group consisting of aryl and alkaryl radicals, for example, aryl radicals such as phenyl, α-naphthyl, β-anthryl, and the like. Moreover, the univalent aromatic radical can be alkaryl radicals such as, for example, o-tolyl, 2,3-xylyl, 2,4-xylyl, 2,6-xylyl, and the like, or o-ethylphenyl, p-ethylphenyl, 2-methyl-α-naphthyl, 4-methyl-α-naphthyl, 7-methyl-α-naphthyl, and the like.

It is to be understood that the foregoing listing of radicals is merely exemplary and other examples will be evident to those skilled in the art. Furthermore, these radicals can be substituted with other substituents provided they are inert to the reactants as, for example, ether linkages.

Exemplary of the alkali or alkaline earth metal salts of organic acids which are employed as reactants in this process are sodium acetate, lithium acetate, barium acetate, calcium acetate, sodium propionate, beryllium propionate, sodium isobutyrate, sodium valerate, lithium dimethyl acetate, sodium caproate, sodium heptylate, potassium caprylate, sodium pelargonate, calcium vinyl acetate, magnesium phenyl acetate, sodium β-naphthyl acetate, lithium benzyl acetate, sodium phenyl ethenyl acetate, sodium cyclohexyl acetate, potassium cyclopentadienyl acetate, sodium β-methoxy methyl butyrate, and the like.

Another embodiment of the instant process is the usage of a metal hydride catalyst. The following examples more fully illustrate this embodiment. Example VII further illustrates that the catalyst of this invention can be prepared in situ in some instances.

Example VII

In a reaction vessel provided with means for heating, stirring, refluxing and continuous addition was added 300 parts mineral oil, 11.5 parts sodium and 41 parts anhydrous sodium acetate. The temperature was gradually raised to 100° C. in high speed stirrer and nitrogen flush was initiated. The temperature was then raised to 260° C. whereupon hydrogen was fed to the nitrogen swept flask. A vigorous reaction occurred with the product turning yellow. The flask was then cooled to room temperature and a sample of the product obtained in the reaction was analyzed by essentially the same deuteration procedure as described in Example I. The analysis showed a ratio of 1.07:1 deuterated to non-deuterated material. This demonstrates that the reaction formed α-sodio-sodium acetate corresponding to a 58% conversion based on total sodium acetate.

Example VIII

α-Sodio-sodium caproate is prepared in essentially the same manner as described in Example VII by the reaction between sodium caproate, sodium and catalytic amounts of sodium hydride.

Example IX

α-Lithio-lithium-2-cyclohexyl acetate is prepared when lithium is reacted with lithium-2-cyclohexyl acetate in the presence of catalytic lithium hydride employing a process essentially the same as described in Example VII.

Example X

Catalytic amounts of barium hydride initiates the reaction between sodium propionate and barium to produce the desired product α-barium-sodium-propionate employing processes essentially the same as those employed in Example VII.

The metals employed in this invention are alkali and alkaline earth metals. More specifically, they are the group I-A and II-A metals of the periodic chart of the elements (Handbook of Chemistry and Physics, 38th edition, Chemical Rubber Publishing Company, 1956). Examples of metal hydrides employed in the process are lithium hydride, sodium hydride, potassium hydride, rubidium hydride, beryllium hydride, magnesium hydride, barium hydride, calcium hydride, and the like. Examples of those metal amides which can be employed are sodio amide, potassium amide, magnesium amide, calcium amide, and the like. In addition, certain substituted metal amides comprising the metal salts of low molecular weight amines for distillation temperatures below 56° C. can be employed. Illustrations are diethyl sodium amide, dimethyl lithium amide, diethyl calcium amide, and other similar substituted amides.

The temperatures employed are those sufficient to initiate reaction. Furthermore, the reaction is conducted at a temperature below the decomposition temperature of the product produced. It is preferred to conduct the process at a temperature ranging from the decomposition temperature of the product produced to 20° less than said decomposition temperature. For example, when reacting sodium and sodium acetate best results are obtained at temperatures below 280° C. but no lower than 260° C.

In general, atmospheric pressures are employed. It has been discovered that in some instance when the hydride catalyst is employed, nominal pressure can be utilized. However, the amide catalyst requires atmospheric conditions. Thus, the following working example illustrates the utilization of pressure in the reaction between sodium acetate and sodium in the presence of catalytic sodium hydride.

Example XI

Into a pressure vessel provided with means for heating, continuous addition, and stirring are added 86 parts sodium acetate, 23 parts of sodium, and 3 parts of sodium hydride. The system is pressured to a 100 p.s.i. with nitrogen and thereupon heated to 260° C. for a period of 2 hours. Upon completion of the reaction the product obtained analyzes for α-sodio-sodium acetate in substantial yields.

Subatmospheric temperatures can be employed and have the advantage of enhancing removal of the volatile by-product thus obtaining a more rapid reaction and more complete shifting of the equilibrium.

Although equal molar quantities of the metal and the acid salts are preferred, a 20% excess of either reactant can be employed. In most cases, however, it is especially preferred to employ the metallic salts of the organic acid in about a 5 to 10% excess so that the metal employed can be quantitatively consumed. In this manner the product obtained may contain some metallic salts of organic acids, but this impurity has not been found detrimental in subsequent use in the α-metallo-metallic salts of organic acids.

The amount of catalysts employed in the process can vary up to 5% of the weight of the metallic salts of an organic acid employed. As has been explained hereinbefore, the process of this invention is inoperable without the utilization of a catalyst and the limits as to the amount of catalysts employed are essentially dependent upon the amount necessary to initiate a reaction. In no case, however, is more than 5% of the weight of the organic acid salts employed. Utilization of catalytic quantities greater than this results in uneconomical operation because of starting products which are lost in the system and which, as has been explained hereinbefore, are difficultly separated from the end product and thus cannot be recycled for efficiency of operation.

In some instances it is desirable to employ the metal reactant in its high surface form. By providing the metal in such a form better control of reaction rates and temperatures are provided, yields can be increased, induction periods can be avoided, and such a form facilitates adaptation to continuous operation. The preparation of the metal for this embodiment is accomplished by mixing the molten metal with a suitable inert solid material having a very large surface area, such as salt, carbon, or in some instances, the metal salt of the organic acid.

Although the general reaction is generally run in the dry state as described hereinbefore for some purposes it is desirable to conduct the reaction under an inert liquid blanket. One of the purposes of such an embodiment is to avoid oxygen contamination by impurities in the flushing gas. Another reason is that this inert blanket acts as a solvent for hydrogen or ammonia gas when used to produce the catalyst of this invention in situ. The inert liquid blanket employed is generally a high boiling hydrocarbon oil, such as mineral oil.

As was illustrated in Example VII hereinbefore, the catalyst can be produced in the reaction in situ. This is accomplished by the reaction of a controlled amount of the ammonia or hydrogen gas with the appropriate metal. Such technique finds usage in such operational procedure as continuous methods for the most part. However, in general it is preferred to pre-form the catalyst before its utilization in the reaction system.

The process of this invention is admirably suited to continuous methods. For example, the reactants separately or together in the proper proportions, are continuously ground to desired particle size, transmitted to a heated movable reactor surface, the volatile by-product is removed and recovered by recycling to the preparation of the metal amide or derivative thereof, and the product is continuously discharged from the reactor. This and other modifications will be evident to those skilled in the art.

The particle size of the reactants is important. In general, it is preferred to employ particle sizes below about 50 microns. The smaller the particle size, the more intimate contact obtained between the reactants and shorter reaction periods are required. As noted previously, the reactants are mixed in the reaction vessel and heated. Although not required, this is the preferable operation since more efficient comminution of the reactants is obtained and economies of operation are realized. It should be understood that the reactants can also be pre-ground or pre-mixed, and further can be fed to the reactor separately in larger particle sizes and mixed and ground in situ. This is particularly true when the agitation provided in the reactor is of the type to provide grinding of the reaction mixture during the course of the reaction. Employing the technique of the grinding along with the agitation enhances the contact between the reactants, thus providing more complete reaction. The suitable method of obtaining this objective is to employ a ball mill as a reactor. Other apparatus can be employed which will be evident to those skilled in the art.

The reaction should be conducted in an inert atmosphere such as argon, nitrogen, krypton, and the like. It is preferable that the inert atmosphere be pre-purified so as to be substantially free of impurities such as oxygen and moisture since these impurities may be taken up in the product.

Although it is generally preferred to employ the metal salt of an organic acid as described hereinabove, it is obvious that the free acid can also be employed to produce the metal salt in situ. Such an embodiment although utilizing two equivalents of metal for each equivalent of metallated product produced nevertheless only employs one equivalent of metal in the metallation of the $\alpha$-carbon position. This embodiment thus is consistent with the stoichiometry described hereinbefore.

Thus, by the process of the instant invention when sodium is reacted with sodium propionate in the presence of dimethyl amino sodium, $\alpha$-sodio-sodium propionate is prepared. Likewise, when potassium-4-methyl caproate is reacted with sodium in the presence of sodium amide, $\alpha$-sodio-potassium-4-methyl caproate is produced. In addition, when potassium is reacted with sodium vinyl acetate in the presence of potassium diethyl amide, $\alpha$-potassio-sodium vinyl acetate is prepared. Furthermore, when barium phenyl acetate is reacted with sodium hydride, $\alpha$-sodio-barium phenyl acetate is produced. $\alpha$-Lithio-lithium isobutyrate is obtained when lithium isobutyrate is reacted with lithium in the presence of lithium hydride. The foregoing examples are cited merely as illustrations and are not intended to be limitations. That is, other combinations of the radicals, materials, and metals defined previously will be evident to those skilled in the art.

When reacting metalic salts of organic acids with metal hydrides according to this invention, the metallo substituted metallic salts of organic acids, as described hereinbefore, are obtained essentially free of other organometallic compounds. That is, the products as obtained by our process are not contaminated with more than about .5% by weight of other organometallic compounds. The process of this invention thus provides these products in essentially pure form thereby permitting their utility in a variety of chemical reactions without the hinderance of competing reactions and the formation of impurities in the final products.

Thus, for example, $\alpha$-sodio-sodium-2-ethyl propionate and $\alpha$-sodio-sodium-2-methyl butyrate when reacted with carbon dioxide result in substituted malonic acids which are obtained in high purity and yields.

Furthermore, the compounds produced by the process of this invention can be employed in the preparation of salts of organic acids as, for example, when $\alpha$-sodio-sodium acetate is reacted with n-octyl bromide as illustrated in the following working example.

*Example XII*

Into a reaction flask provided with means for heating and refluxing were added 10.4 parts of $\alpha$-sodio-sodium acetate and 38.6 parts of n-octyl bromide utilizing 50 parts of n-nonane as a diluent. The mixture was externally heated to reflux temperature (about 150° C.) and maintained at this temperature for 6 hours. The solid product formed was then filtered from the reaction mixture. This product, consisting essentially of sodium decanoate, was dissolved in water and acidified with hydrochloric acid. A yellow oil separated which was extracted three times with ether. Upon evaporation of the ether from the product decanoic acid having a melting point of 27° C. was recovered in high yield.

Likewise, in Example XII equally good results are obtained with other products produced by the process of this invention, such as $\alpha$-potassio-potassium acetate, $\alpha$-calcio-barium acetate, and the like.

Another way in which the compounds produced by the process of this invention find utility is in the manufacture of organic esters as, for example, when an organic monohalide having at least one hydrogen atom on the halogen substituted carbon atom is reacted with a metallo substituted metallic salt of this invention. The following examples more fully illustrate this embodiment.

*Example XIII*

Into a reaction vessel provided with means for heating and containing 104 parts of $\alpha$-sodio-sodium acetate were added 420 parts of benzyl chloride. This mixture was then heated to 60° C. Vigorous reaction took place which was completed within a few minutes concurrently with a temperature rise. The reaction mass became nearly solid. The product upon cooling to room temperature was filtered and the solids washed with hexane. The filtrate was vacuum distilled to remove benzyl chloride and a fraction boiling at 240° C. at 14 millimeters of mercury was collected. This fraction was redistilled at atmospheric pressure and a fraction boiling between 310–340° C. was analyzed and found to contain 81.6% carbon, 6.74% hydrogen, no nitrogen and less than 1% chlorine which compares with the benzyl ester of phenyl propionic acid which has 80.2% carbon and 6.7% hydrogen.

*Example XIV*

By reacting 160 parts of $\alpha$-sodio-sodium caproate with 253 parts of benzyl chloride at 100° C. as in the preceeding example, the benzyl ester of $\beta$-butyl phenyl propionic acid is obtained.

Furthermore, the compounds produced by the process of this invention can be utilized in the preparation of thio acids by the reaction of a metallo substituted metallic salt of an organic acid with sulfur employing temperatures of at least about 100° C. A preferred example of this utility is the reaction of 60.3 parts of $\alpha$-sodio-sodium acetate with 32 parts of sulfur employing a toluene solvent and reflux temperatures.

Having thus described the novel process of this invention, it is not intended that it be limited except as noted in the appended claims.

I claim:

1. A process for the preparation of $\alpha$-metallo-metallic salts of organic acids which comprises reacting a metal salt of a carboxylic acid containing at least one $\alpha$-hydrogen atom with a metal in the presence of a catalyst selected from the group consisting of alkali metal amides, alkaline earth metal amides, alkali metal hydrides and alkaline earth metal hydrides, said process being conducted at a temperature ranging from the decomposition temperature of the product produced to 20° less than said decomposition temperature.

2. The process of claim 1 wherein essentially atmospheric pressures are employed when said catalyst comprises a metal amide, wherein the amount of said catalyst employed is less than 5% of the weight of said carboxylic acid salt.

3. A process for the preparation of $\alpha$-sodio-sodium acetate which comprises reacting sodium acetate with sodium in the presence of catalytic amounts of sodamide employing atmospheric pressure and a temperature between 261° and 274° C.

4. A process for the preparation of $\alpha$-sodio sodium acetate, which comprises reacting sodium acetate with sodium and a catalytic amount of sodium hydride, the quantity of sodium hydride being less than 5% of the weight of the sodium acetate, and the reaction being conducted at a temperature of from 260° to 280° C. while mixing and stirring the reactants.

5. A process for the preparation of $\alpha$-sodio sodium acetate, which comprises reacting sodium acetate with sodium and a catalytic amount of sodamide, the quantity of sodamide being less than 5% of the weight of the sodium acetate, and the reaction being conducted under atmospheric pressure at a temperature of from 260° to 280° C. while mixing and stirring the reactants.

References Cited in the file of this patent

Morton et al.: J.A.C.S., vol. 60, 1426–9 (1938).
Freidlin et al.: 32 C.A., 9040 (1938).
Freidlin et al.: 33 C.A., 8566–7 (1939).